(12) United States Patent
Shekhar

(10) Patent No.: US 10,257,106 B1
(45) Date of Patent: Apr. 9, 2019

(54) DATA PACKET SWITCHING WITHIN A COMMUNICATIONS NETWORK INCLUDING AGGREGATED LINKS

(71) Applicant: Juniper Networks, Inc., Sunnyvale, CA (US)

(72) Inventor: Ravi Shekhar, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 203 days.

(21) Appl. No.: 15/196,671

(22) Filed: Jun. 29, 2016

Related U.S. Application Data

(63) Continuation of application No. 12/842,785, filed on Jul. 23, 2010, now Pat. No. 9,407,537.

(51) Int. Cl.
*H04J 3/16* (2006.01)
*H04L 12/28* (2006.01)
*H04L 12/54* (2013.01)
*H04L 12/709* (2013.01)
*G06F 15/173* (2006.01)
*H04L 12/891* (2013.01)
*H04L 12/723* (2013.01)
*H04L 29/06* (2006.01)
*H04L 12/947* (2013.01)

(52) U.S. Cl.
CPC ............ *H04L 47/41* (2013.01); *H04L 45/245* (2013.01); *H04L 45/50* (2013.01); *H04L 49/252* (2013.01); *H04L 69/14* (2013.01); *H04L 69/18* (2013.01); *H04L 69/22* (2013.01)

(58) Field of Classification Search
CPC ..... H04L 12/54; H04L 29/0653; H04L 45/16; H04L 45/245; H04L 45/74; H04L 49/252; H04L 69/14; H04L 69/18; H04L 69/22
See application file for complete search history.

(56) References Cited

U.S. PATENT DOCUMENTS 6,697,361 B2 2/2004 Fredette
6,973,082 B2 12/2005 Devi et al.
6,973,504 B2 12/2005 Nomura
(Continued)

OTHER PUBLICATIONS

Office Action for U.S. Appl. No. 12/842,785, dated Apr. 29, 2013.
(Continued)

*Primary Examiner* — Alpus Hsu
(74) *Attorney, Agent, or Firm* — Cooley LLP

(57) ABSTRACT

In one embodiment, an apparatus includes a memory, a communications interface and a processor. The processor is operatively coupled to the memory and the communications interface. The processor is configured to receive, at a first time, a label identifier associated with an aggregated link within the communications network via the communications interface. The aggregated link including a plurality of redundant links. The processor is configured to receive, at a second time after the first time, a data packet including the label identifier via the communications interface. The processor is configured to send at least a portion of the data packet via a first link separate from the aggregated link based on the label identifier. The processor is configured to not send the data packet via a link from the plurality of redundant links of the aggregated link based on the label identifier.

20 Claims, 6 Drawing Sheets

(56) References Cited

U.S. PATENT DOCUMENTS

| | | |
|---|---|---|
| 7,126,907 B2 | 10/2006 | Carpini |
| 7,277,386 B1 | 10/2007 | Ferguson et al. |
| 7,292,575 B2 | 11/2007 | Lemieux et al. |
| 7,345,991 B1 | 3/2008 | Shabtay |
| 7,551,616 B2 | 6/2009 | Devi et al. |
| 7,602,726 B1 * | 10/2009 | Sundaresan ............. H04L 45/10 370/237 |
| 7,633,938 B2 * | 12/2009 | Kinoshita ............... H04L 45/00 370/252 |
| 7,675,859 B2 | 3/2010 | Takase et al. |
| 7,697,528 B2 | 4/2010 | Parry et al. |
| 7,843,896 B2 | 11/2010 | Shimizu |
| 7,940,645 B2 | 5/2011 | Kim et al. |
| 7,974,202 B2 | 7/2011 | Solomon |
| 7,983,267 B2 | 7/2011 | Takase et al. |
| 8,027,246 B2 | 9/2011 | Yumoto et al. |
| 8,077,613 B2 | 12/2011 | Bitar |
| 8,098,572 B2 | 1/2012 | Zhou et al. |
| 8,284,654 B2 | 10/2012 | Bitar |
| 8,369,335 B2 | 2/2013 | Jha |
| 8,446,822 B2 | 5/2013 | Bitar |
| 8,724,456 B1 * | 5/2014 | Hong ..................... G06F 11/00 370/225 |
| 8,792,497 B2 | 7/2014 | Rajagopalan |
| 8,989,014 B2 | 3/2015 | Bader |
| 2004/0052256 A1 | 3/2004 | Hameleers |
| 2004/0228278 A1 | 11/2004 | Bruckman et al. |
| 2006/0039384 A1 | 2/2006 | Dontu et al. |
| 2009/0279431 A1 | 11/2009 | Baruah et al. |
| 2010/0149988 A1 | 6/2010 | Matsubara et al. |
| 2011/0292788 A1 * | 12/2011 | Tsuchiya ............. H04L 12/4625 370/218 |

OTHER PUBLICATIONS

Final Office Action for U.S. Appl. No. 12/842,785, dated Nov. 7, 2013.
Office Action for U.S. Appl. No. 12/842,785, dated Oct. 30, 2014.
Final Office Action for U.S. Appl. No. 12/842,785, dated Apr. 14, 2015.
Office Action for U.S. Appl. No. 12/842,785, dated Dec. 30, 2015.

* cited by examiner

| Label Identifier | Label Context | Aggregated Link Identifier |
| --- | --- | --- |
| LBL611 | LC621 | ALI631 |
| LBL612 | LC622 | ALI632 |
| LBL613 | LC623 | ALI633 |
| LBL614 | LC624 | ALI634 |
| LBL615 | LC625 | ALI635 |

| Label Identifier | Aggregated Link Identifier |
| --- | --- |
| LBL511 | ALI531 |
| LBL512 | ALI532 |
| LBL513 | ALI533 |
| LBL514 | ALI534 |
| LBL515 | ALI535 |

Receive, at a first time and via a communications interface, a label identifier associated with an aggregated link within a communications network and including multiple redundant links operatively coupled to multiple network elements of the communications network
810

↓

Store, after the first time and before a second time, at a first memory location of a memory the label identifier to produce a stored label identifier
820

↓

Receive a label context identifier associated with a network element within the communications network
830

↓

Store, at a third time and before the second time, at a second memory location of the memory the label context identifier to produce a stored label identifier such that the first memory location is associated with the second memory location
840

↓

Receive, at the second time after the first time and via the communications interface, a data packet including a label identifier corresponding to the stored label identifier and a label context identifier corresponding to the stored label context identifier
850

↓

Discard the label identifier and the label context identifier from the data packet
860

↓

Send (1) the data packet, or (2) the data packet with one or more portions of the data packet omitted, via a first link separate from the aggregated link based on the label identifier
870

↓

Not send, based on the label identifier, the data packet via a link from the multiple redundant links of the aggregated link
880

FIG. 8

DATA PACKET SWITCHING WITHIN A COMMUNICATIONS NETWORK INCLUDING AGGREGATED LINKS

CROSS-REFERENCE TO RELATED APPLICATIONS

This application claims priority to and is a continuation of U.S. patent application Ser. No. 12/842,785, (now U.S. Pat. No. 9,407,537), filed Jul. 23, 2010, and entitled "Data Packet Switching within a Communications Network Including Aggregated Links," which is incorporated herein by reference in its entirety.

BACKGROUND

One or more embodiments relate generally to switching data packets within a communications network including aggregated links. More specifically, one or more embodiments relate to preventing data packets received via an aggregated link from being transmitted via any link in that aggregated link.

Known methods of preventing data packets received via an aggregated link from being transmitted via any link in that aggregated link are based on multiple virtual links using Multiprotocol Label Switching (MPLS). Virtual links or tunnels are defined by labels that identify the destination network element (e.g., a network element such as a gateway, switch or router) of a data packet within a communications network. Data packets received via an aggregated link are encapsulated in the labels, and network elements forward the data packets through a communications network based on the labels. The data packets are received at the destination network element within the communications network, and the destination network element can determine to which, if any, ports (i.e., egress ports operatively coupled to one or more computing devices) of the destination network element the data packet should be forwarded based on the label. Finally, the data packets are forwarded to the appropriate ports of the destination network element.

Such known methods suffer several disadvantages. For example, the number of tunnels and, therefore, labels supported within the communications network is proportional to the number of aggregated links and destination network elements within the communications network. Because each destination network element can determine via which aggregated link a data packet was received, each tunnel is particular to a set of destination network elements and the aggregated link via which a data packet sent via that tunnel was received. That is, there is a tunnel, and corresponding label, for each aggregated link for each set of possible destination network elements. Thus, the number of tunnels, and corresponding labels, which are managed within the communications network, can become large and consume significant amounts of memory and processing resources within the network elements of the communications network.

SUMMARY

In one embodiment, an apparatus includes a memory, a communications interface and a processor. The processor is operatively coupled to the memory and the communications interface. The processor is configured to receive, at a first time, a label identifier associated with an aggregated link within the communications network via the communications interface. The aggregated link including a plurality of redundant links. The processor is configured to receive, at a second time after the first time, a data packet including the label identifier via the communications interface. The processor is configured to send at least a portion of the data packet via a first link separate from the aggregated link based on the label identifier. The processor is configured to not send the data packet via a link from the plurality of redundant links of the aggregated link based on the label identifier.

BRIEF DESCRIPTION OF THE DRAWINGS

FIG. 5 is an illustration of a table relating labels and aggregated link identifiers, according to an embodiment.

FIG. 6 is an illustration of a table relating labels, label contexts, and aggregated link identifiers, according to an embodiment.

FIG. 8 is a flow chart of a method, according to an embodiment.

DETAILED DESCRIPTION

Figure 1:
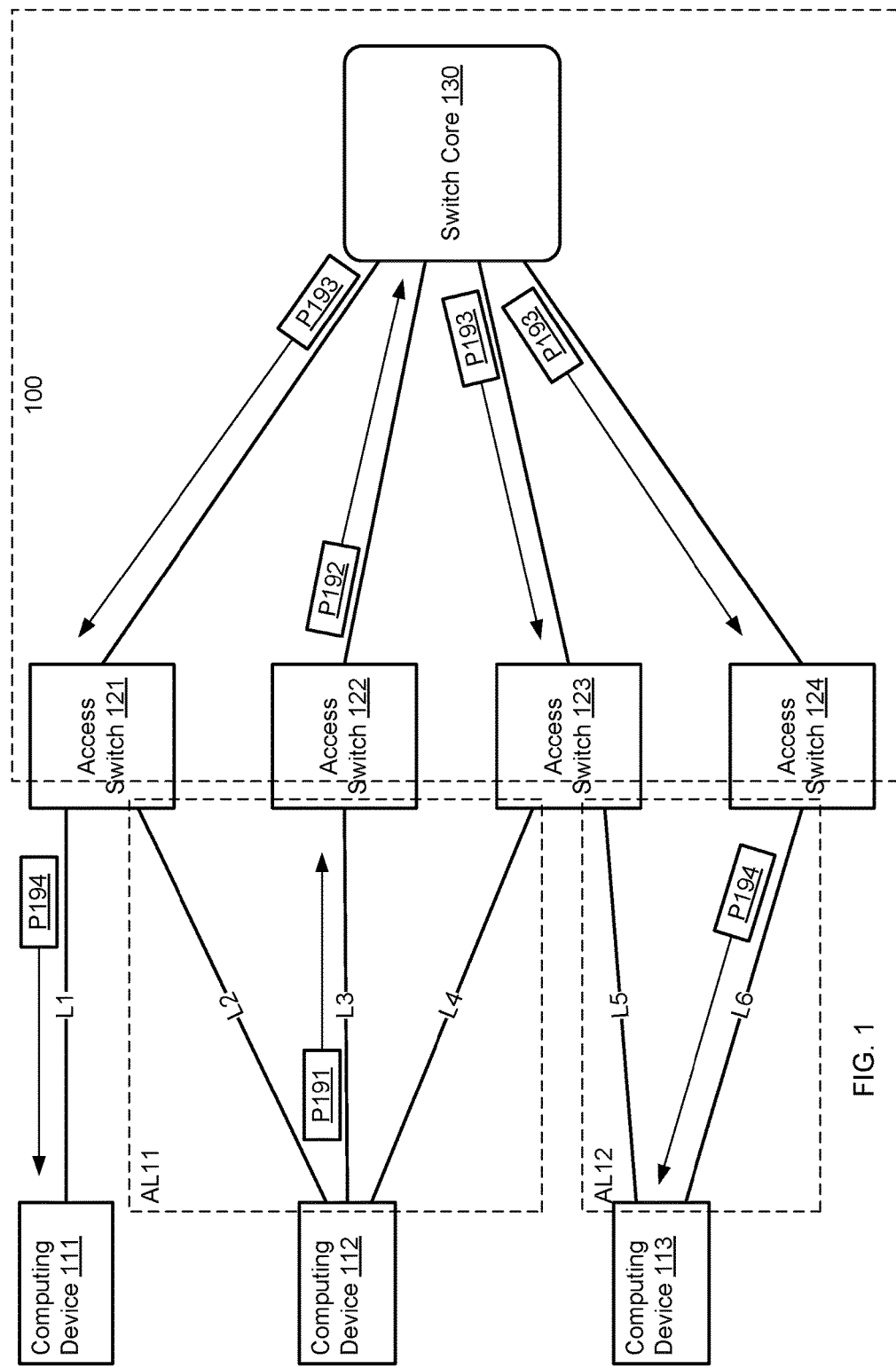
FIG. 1 is a schematic block diagram of a communications network and computing devices, according to an embodiment.

One or more embodiments can forward (i.e., route or switch) data packets received via an aggregated link within an communications network without sending the data packets via any links of the aggregated link via which the data packet was received. In other words, one or more embodiments can prevent the formation of loops within the communications network by preventing data packets to be sent via the aggregated links from which the data packets were received at the communications networks.

A communications network can be any of a variety of topologies of network elements that are in communication with one another. Network elements can be network switches (switches), network routers (routers), edge devices such as access switches, network bridges (bridges), network gateways (gateways) and/or other elements or components of a communications network. Additionally, a communications network can include a switch core network element such as a multi-stage switch fabric. The network elements communicate one with another to transmit (or forward or send) data through the communications network.

In some embodiments, for example, a switch core can be a rearrangeably non-blocking Clos network such as a Benes network. In other embodiments, a switch core can be a strictly non-blocking Clos network. In still other embodiments, a switch core can be any switch fabric configured to route data from a first access switch to a second access switch.

Computing devices coupled to one or more network elements such as access switches can communicate with one another via the communications network. For example, a computing device such as a personal computer can be operatively coupled (e.g., via a wired or wireless network connection) to a network element of the communications network via a link. That computing device can send data to the network element and the network element can forward that data to another computing device via one or more other network elements within the communications network.

The link by which a computing device is operatively coupled to the communications network can be one of multiple links between the computing device and network elements within the communications network. Such multiple links between a computing device (or network element) and one or more network elements of a communications network can be referred to collectively as an aggregated link. In other words, a computing device (or network element) can be operatively coupled to a communications network (or one or more network elements of a communications network) via an aggregated link. For example, a computing device can be connected to two network elements within a communications network via an aggregated link including two separate links—one link per network element. Thus, the computing device can send data to and receive data from other computing devices operatively coupled to the communications network via either of the two links in the aggregated link. In some embodiments, the computing device can handle the aggregated link as a single logical link. In other words, the computing device can provide an interface or application programming interface (API) for sending data to and receiving data from the aggregated link (e.g., via an operating system hosted at the computing device) to application programs and other software modules that presents the aggregated link as a single link. Thus, application programs and other software modules that use or are bound to the interface do not manage and are not aware of the individual links that define the aggregated link.

Device drivers, middleware, and/or other software modules defining or providing the interface at the computing device can determine which link from the links of the aggregated link will be used to send a data packet. For example, a device driver can monitor data throughput and/or link speed of the links of an aggregated link and send a data packet via the link with the highest data throughput and link speed. In some embodiments, other factors or parameters of the links of an aggregated link such as bit error rates, checksum errors, and bus or link collisions can be monitored and used at a device driver or other software module to select a link via which data will be sent.

The communications network (or network elements within the communications network) can add one or more label identifiers to data that are forwarded from one network element to other network elements to identify the source aggregated link of the data (i.e., the aggregated link via which the data were received). A network element that receives the data including the label identifier can determine whether to forward the data via a particular link of that network element based on the label identifier. For example, the network element can determine that a link is included within the aggregated link identified by the label identifier and not forward the data via that link because the computing device operatively coupled to that link is operatively coupled to the source aggregated link of the data. In other words, the network element does not forward data via an aggregated link identified by a label identifier as the source aggregated link for the data.

As used in this specification, the singular forms "a," "an" and "the" include plural referents unless the context clearly dictates otherwise. Thus, for example, the term "a processor" is intended to mean a single processor or multiple processors; and "memory" is intended to mean one or more memories, or a combination thereof.

FIG. 1 is a schematic block diagram of a communications network and computing devices, according to an embodiment. Communications network 100 includes switch core 130 and access switches 121, 122, 123 and 124. Communications network 100 can be a packet-based communications network in which data are grouped into data packets and sent through communications network 100 as data packets. Each data packet can describe its source and destination using, for example, an identifier (or address) of the computing device or network element that is the source of that data packet and an identifier (or address) of the computing device or network element that is the destination address of that data packet. Furthermore, data packets can vary in size or length (e.g., the number of bytes of data in each data packet) and each data packet can include a header portion that describes the length of that data packet and, optionally, further describe or characterize that data packet.

In some embodiments, communications network 100 can be a cell-based communications network in which data are grouped into fixed-length cells that are sent through the communications network. Similar to data packets, each cell can describe its source and destination using, for example, an identifier (or address) of the computing device or network element that is the source of that data cell, and an identifier (or address) of the computing device or network element that is the destination address of that data cell. Furthermore, each data cell can include a header portion that describe or characterize that data cell. Although data packets and data cells can be distinguished, as discussed above, the term data packet will be used herein to refer generically to data packets and data cells. Thus, embodiments discussed in relation to data packets are applicable to embodiments based on data cells. Furthermore, embodiments discussed in relation to data cells are applicable to embodiments based on data packets.

In some embodiments, communications network 100 can include a data plane and a control plane. A data plane can be a portion of communications network 100 in which data signals (e.g., data packets or data cells sent between network elements of the communications network 100 and computing devices operatively coupled to communications network 100) are transmitted through communications network 100. A control plane can be a portion of a communications network in which control signals (e.g., routing information related to data signals and state information related to one or more stages or network elements of communications network 100) are transmitted within communications network 100. A data plane and a control plane can be separate physical portions or segments of communications network 100 each including (or defined by) separate cabling, back planes, mid-planes, and/or other physical portions of a network. In some embodiments, a data plane and a control plane can be logically separate. That is, the data plane and the control plane can transmit information via common physical signaling and/or common physical channels (i.e., physical portions or segments of communications network 100 including (or defined by) cabling, back planes, mid-planes, and/or other physical portions of a network), but can be separated by time division, frequency division, addressing, and/or other logical divisions.

Access switches 121, 122, 123 and 124 are operatively coupled to switch core 130 via one or more network links or connections including a physical layer, a logical layer and/or other protocol layers. For example, access switches 121, 122, 123 and 124 can be operatively coupled to switch core 130 via a physical layer including a signaling protocol (e.g., binary transmission protocol and physical addressing) and electrical cabling, optical cabling, an electrical backplane, an optical backplane, and/or a combination of one or more of these or other coupling mechanisms. Additionally, access switches 121, 122, 123 and 124 can be operatively coupled to computing devices 111, 112 and 113 via a logical layer including data framing (e.g., dividing data sets into data packets and/or data cells), logical addressing, data security and/or other protocols. Thus, access switches can be in communication with computing devices 111, 112 and 113 and network elements such as switch core 130 of communications network 100.

Access switches 121, 122, 123 and 124 can be network elements that are edge devices of communications network 100. In other words, as illustrated in FIG. 1, access switches 121, 122, 123 and 124 can communicate with computing devices outside of communications network 100 and other network elements such as switch core 130 inside communications network 100.

Figure 2:
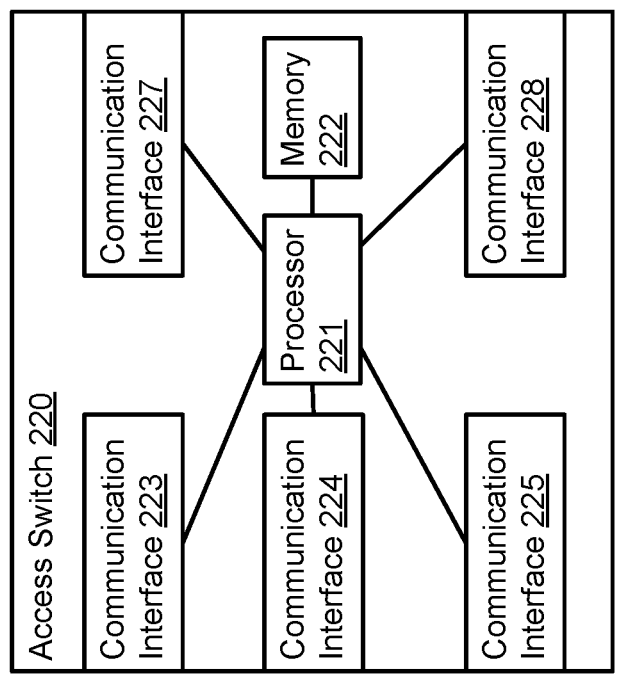
FIG. 2 is a schematic block diagram of an access switch, according to an embodiment.

FIG. 2 is a schematic block diagram of access switch 220, according to an embodiment. As illustrated in FIG. 2, access switch 220 includes processor 221 and memory 222 operatively coupled to processor 221. Memory 222 can store, for example, an operational instructions such as an operating system (e.g., an embedded operating system, a real-time operating system, or a general purpose operating system) or other software module that is hosted at processor 221. In other words, instructions that define a software module effecting operation of access switch 220 can be stored at memory 222, and processor 221 can access the instructions at memory 222 and execute the instructions at processor 221 to provide the operational logic or functionality of access switch 220.

Additionally, access switch 220 includes communication interfaces 223, 224, 225, 227 and 228 operatively coupled to processor 221. Processor 221 can send and receive data via communication interfaces 223, 224, 225, 227 and 228. Communication interfaces 223, 224, 225, 227 and 228 can be homogeneous or heterogeneous. For example, communication interfaces 223, 224 and 225 can be packet-based communication interfaces and communication interfaces 227 and 228 can be cell-based communication interfaces. Furthermore, communication interfaces 223, 224 and 225 can be electrical communication interfaces and communication interfaces 227 and 228 can be optical communication interfaces. In some embodiments, access switch 220 can function as a bridge between a computing device with packet-based communications operatively coupled to one of communication interfaces 223, 224 and 225 and network elements with cell-based communications within a communications network.

Returning to FIG. 1, computing device 111 is operatively coupled to access switch 121 of communications network 100 via link L1. Computing device 112 is operatively coupled to access switches 121, 122 and 123 of communications network 100 via links L2, L3 and L4, respectively. Links L2, L3 and L4 are included in (or are part of or define) aggregated link AL11. Computing device 113 is operatively coupled to access switches 123 and 124 of communications network 100 via links L5 and L6, respectively. Links L5 and L6 are included in aggregated link AL12.

Figure 3:
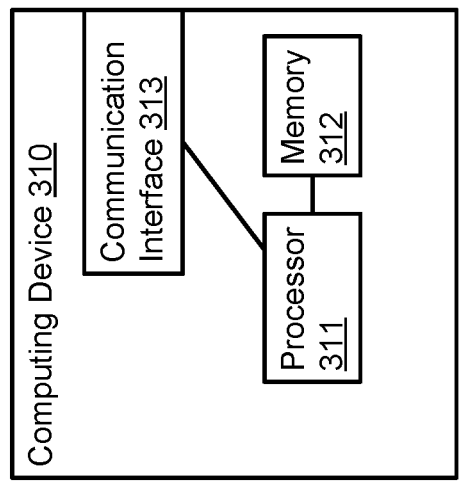
FIG. 3 is a schematic block diagram of a computing device, according to an embodiment.

FIG. 3 is a schematic block diagram of computing device 310, according to an embodiment. As illustrated in FIG. 3, computing device 310 includes processor 311 and memory 312 operatively coupled to processor 311. Memory 312 can store, for example, an operational instructions such as an operating system (e.g., an embedded operating system, a real-time operating system, or a general purpose operating system) or other software module that is hosted at processor 311. In other words, instructions that define a software module effecting operation of computing device 310 can be stored at memory 312, and processor 311 can access the instructions at memory 312 and execute the instructions at processor 311 to provide the operational logic or functionality of computing device 310.

Additionally, computing device 310 includes communication interface 313. Processor 311 can send and receive data via communication interface 313. Communication interface 313 can be one of a variety of communication interfaces. For example, in some embodiments, communication interface 313 can be a packet-based communication interface. In some embodiments, communication interface 313 can be a cell-based communication interface. In some embodiments, communication interface 313 can be electrical communication interface. In some embodiments, communication interface 313 can be optical communication interface.

Returning to FIG. 1, links L1, L2, L3, L4, L5 and L6 can be one or more of various network links or connections including a physical layer, a logical layer and/or other protocol layers. For example, computing devices 111, 112 and 113 can be operatively coupled to communications network 100 (or access switch 121, access switch 122, access switch 123 and access switch 124) by links L1; L2, L3 and L4; and L5 and L6, respectively, via a physical layer including a signaling protocol (e.g., binary transmission protocol and physical addressing) and electrical cabling, optical cabling, an electrical backplane, an optical backplane, and/or a combination of one or more of these or other coupling mechanisms. Additionally, computing devices 111, 112 and 113 can be operatively coupled to communications network 100 (or access switch 121, access switch 122, access switch 123 and access switch 124) by links L1; L2, L3 and L4; and L5 and L6, respectively, via a logical layer including data framing (e.g., dividing data sets into data packets and/or data cells), logical addressing, data security and/or other protocols. In some embodiments, links L1, L2, L3, L4, L5 and L6 can be homogenous. For example, links L1, L2, L3, L4, L5 and L6 can be Ethernet links over Category 5e twisted pair cables. In some embodiments, links L1, L2, L3, L4, L5 and L6 can be heterogeneous. For example, links L1, L3 and L6 can be Ethernet links over Category 5e twisted pair cables and links L2, L4 and L6 can be Fiber Channel links over single- or multi-mode fiber cables.

Access switches 121, 122, 123 and 124 can receive data (e.g., data packets) from computing devices 111, 112 and 113 and forward that data to others of computing devices 111, 112 and 113 via switch core 130 and access switches 121, 122, 123 and 124. Thus, computing devices 111, 112 and 113 can communicate one with another via communications network 100.

Computing device 112 can communicate with computing devices 111 and 113 via communications network 100 using aggregated link AL11. More specifically, computing device 113 can communicate with computing devices 111 and 112 via communications network 100 using any of links L2, L3 and L4 that define aggregated link AL11. Thus, computing device 112 can send and/or receive data via communication network 100 using links L2, L3 and L4 in parallel or simultaneously to increase a data transfer rate at computing device 112. Furthermore, if one or more of links L2, L3 and L4 are severed or become disabled, computing device 112 can send and/or receive data via communication network 100 using the remaining links of links L2, L3 and L4. For example, if link L3 becomes disabled during operation of computing device 112, computing device 112 can cease sending and/or receiving data via link L3, and send and/or receive data only via links L2 and L4. Thus, the links that define or are included in an aggregated link can be referred to as parallel or redundant links because they can provide parallelism (e.g., parallel links or routes to and from a communications network) and redundancy between a computing device and communications network.

In some embodiments, links L2, L3 and L4 can be homogenous (i.e., share a common physical layer, logical layer, and/or additional protocol layer). For example, links L2, L3 and L4 can be Ethernet links over Category 5e twisted pair cables. In some embodiments, links L2, L3 and L4 can be heterogeneous (i.e., have different physical layers, logical layers, and/or additional protocol layers). For example, link L3 can be an Ethernet link over a Category 5e twisted pair cable and links L2 and L4 can be Fiber Channel links over single- or multi-mode fiber cables.

Similarly, computing device 113 can communicate with computing devices 111 and 112 via communications network 100 using aggregated link AL12. More specifically, computing device 113 can communicate with computing devices 111 and 112 via communications network 100 using either of links L5 and L6 that define aggregated link AL12. Thus, computing device 113 can send and/or receive data via communication network 100 using links L5 and L6 in parallel or simultaneously to increase a data transfer rate at computing device 113. Furthermore, if one of links L5 and L6 is severed or becomes disabled, computing device 113 can send and/or receive data via communication network 100 using the remaining link of links L5 and L6. For example, if link L5 becomes disabled during operation of computing device 113, computing device 113 can cease sending and/or receiving data via link L5, and send and/or receive data only via link L6.

In some embodiments, links L5 and L6 can be homogenous. For example, links L5 and L6 can be Ethernet links over Category 5e twisted pair cables. In some embodiments, links L5 and L6 can be heterogeneous (i.e., have different physical layers, logical layers, and/or additional protocol layers). For example, link L5 can be an Ethernet link over a Category 5e twisted pair cable and link L6 can be a Fiber Channel link over a single- or multi-mode fiber cable.

Data packets P191, P192, P193 and P194 illustrate transmission of a broadcast data packet from computing device 112 to computing devices 111 and 113 via communications network 100. Additional details regarding P191, P192, P193, and P194 will be discussed with reference to FIG. 4, which illustrates data packets, according to the embodiment described in FIG. 1. Although this embodiment is discussed with reference to a broadcast data packet, the methods, apparatus and systems discussed in relation to this embodiment are applicable to other data sets such as data cells, unicast data sets, and multicast data sets within a communications network.

Figure 4:
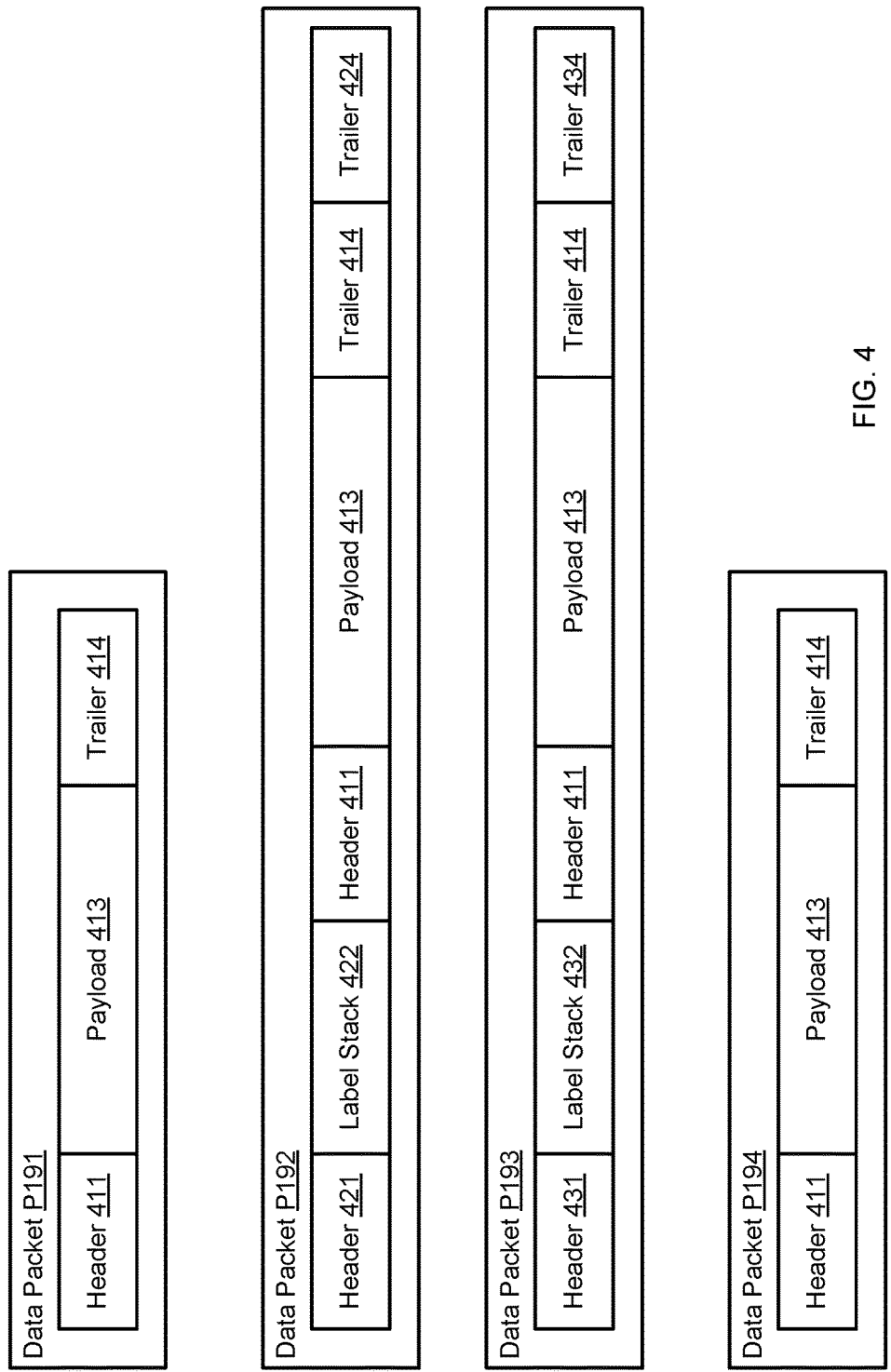
FIG. 4 illustrates data packets, according to the embodiment described in FIG. 1.

Computing device 112 sends data packet P191 to computing devices 111 and 113 as a broadcast data packet. Data packet P191 is sent to access switch 122 of communications network 100 via link L3 of aggregated link AL11. As illustrated in FIG. 4, data packet P191 includes header 411, payload 413, and trailer 414. Header 411 can include, for example, a source identifier or address such as a device address of computing device 112 and a destination identifier or address such as a broadcast address, unicast address such as a device address of computing device 113, or a multicast address. Payload 413 can include, for example, data to be transferred to one or more computing devices. Trailer 414 can include a checksum or digital signature of one or more portions of data packet P191 such as payload 413. In some embodiments, one or more of header 411, payload 413, and trailer 414 can be omitted or include additional or different information than discussed above. For example, trailer 414 can be omitted from data packet P191 and header 411 can include a synchronization sequence.

Returning to FIG. 1, access switch 122 receives data packet P191 and determines that data packet P191 was received via aggregated link AL11. For example, access switch 122 can detect that data packet P191 was received at a port of access switch 122 that is bound to or associated with aggregated link AL11. In alternative embodiments, a header of data packet P191 can include an identifier of aggregated link AL11 and access switch 122 can determine that data packet P191 was received via aggregated link AL11 using, for example, a lookup table that correlates the identifier to aggregated link AL11. In some embodiments, the identifier can uniquely identify aggregated link AL11 within communications network 100.

After access switch 122 determines that data packet P191 was received via aggregated link AL11, access switch 122 adds one or more label identifiers (or labels) to data packet P191 to define data packet P192. The label identifiers can be, for example, multiprotocol label switching labels (MPLS) labels that identify the aggregated link, AL11 in FIG. 1, via which a data packet such as data packet P191 was received. In some embodiments, other labels and/or identifiers are added to a data packet to identify a source aggregated link (i.e., the aggregated link via which that data packet was received) for that data packet. Access switch 122 can determine or select a label identifier that identifies source aggregated link AL11 using, for example, an identifier (not illustrated in FIG. 4) included within data packet P191 or a lookup table that correlates label identifiers (or labels) with identifiers of aggregated links.

FIG. 5 is an illustration of a table relating labels and aggregated link identifiers, according to an embodiment. Table 500 can be stored, for example, at a memory of an access switch and accessible to a processor of that access switch hosting a software module such as an operating system. As illustrated in FIG. 5, table 500 includes label identifiers LBL511, LBL512, LBL513, LBL514 and LBL515, and aggregated link identifiers ALI531, ALI532, ALI533, ALI534 and ALI535. The label identifiers are arranged in one column of table 500 and the aggregated link identifiers are arranged in another column of table 500. Each row of table 500 includes an aggregated link identifier and a label identifier that is related to (or associated with) the aggregated link identified by that aggregated link identifier. In other words, the label identifier of a row is the label that identifies the aggregated link identified by the aggregated link identifier of that row. Said differently, the rows of table 500 indicate which label identifier is related to which aggregated link. For example, label identifier LBL511 identifies the aggregated link identified by aggregated link identifier ALI531. Thus, when an access switch (such as access switch 122 illustrated in FIG. 1) receives a data packet via an aggregated link that is identified by aggregated link identifier ALI531, that access switch can add label identifier LBL511 to that data packet (or define a new data packet including data from the original data packet and label identifier LBL511) to identify that aggregated link as the source aggregated link for that data packet.

In some embodiments, labels identifiers can occupy less space or memory that aggregated link identifiers. In other words, label identifiers and aggregated link identifiers can have different lengths. For example, label identifiers within a communications network can be eight bits in length, and aggregated link identifiers can be 32 bits in length. In some embodiments, label identifiers and aggregated link identifiers within a communications network can be of equal length. In some embodiments, an aggregated link identifier can be a port number or identifier such as an identifier of an ingress port and/or egress port that is operatively coupled to a link of an aggregated link. Thus, a label identifier for a data packet can be selected from table 500 based on a port of an access switch at which that data packet was received.

FIG. 6 is an illustration of a table relating labels, label contexts, and aggregated link identifiers, according to an embodiment. Table 600 can be stored, for example, at a memory of an access switch and accessible to a processor of that access switch hosting a software module such as an operating system. Similar to table 500, table 600 includes label identifiers LBL611, LBL612, LBL613, LBL614 and LBL615, and aggregated link identifiers ALI631, ALI632, ALI633, ALI634 and ALI635. Additionally, table 600 includes label contexts LC621, LC622, LC623, LC624 and LC625. A label context can be added to (or included within) a data packet in addition to a label identifier to collectively identify a source aggregated link of that data packet. The label context can indicate a context or namespace of a label identifier.

For example, each access switch within a communications network can be a context and implement its own set of label identifiers. That is, each access switch can—independent of the other access switches—define a label identifier for an aggregated link. Thus, one access switch can associate one label identifier with an aggregated link and another access switch can associate a different label identifier with that aggregated link. Each access switch can distribute a list of the label identifiers and the aggregated link identifiers, with which each label identifier is associated, to the other access switches. Each access switch can store the label identifiers, context identifiers and aggregated link identifiers in a table similar to table 600.

An access switch can, upon receiving a data packet including a label identifier and a context identifier that identify a source aggregated link of that data packet, determine which aggregated link is the source aggregated link by performing a lookup on the table using the label identifier and the context identifier as keys (or collectively as a single key). Thus, if two access switches each associate one label identifier with different aggregated links, another access switch upon receiving a data packet including a label identifier and context identifier can determine which aggregated link is the source aggregated link of that data packet by matching the label identifier and context identifier from the data packet with a label identifier and a context identifier in the table because the context identifiers for the two access switches are different. Multiple label values within a data packet such as a label context and a label identifier can be referred to as a label stack. In some embodiments, a label stack can include multiple label identifiers, label contexts and/or other label values.

The label identifiers are arranged in one column of table 600, the label contexts are arranged in one column of table 600, and the aggregated link identifiers are arranged in another column of table 600. Each row of table 600 includes an aggregated link identifier and a label identifier and a context identifier that are related to (or associated with) the aggregated link identified by that aggregated link identifier. In other words, the label identifier and label context of a row is the label that identifies the aggregated link identified by the aggregated link identifier of that row. Said differently, the rows of table 600 indicate which label identifier and label context are related to which aggregated link. Furthermore, it can be said that a row of table 600 indicates that the label identifier of that row within the label context of that row are related to aggregated link identified by the aggregated link identifier of that row.

In some embodiments, an access switch can include, at a memory, table 500 and table 600. The access switch can access table 500 to determine which label identifier to add to a data packet. In some embodiments, the access switch can also add a context identifier of that access switch to the data packet. The access switch can access table 600 upon receipt of a data packet including a label identifier and/or label context to determine a source aggregated link of that data packet.

In some embodiments, the functions of rows and columns of table 500 and/or table 600 can be reversed. That is, the label identifiers, the label contexts and/or the aggregated link identifiers can be included within respective rows of a table, and the columns can indicated relationships between or associations among a label identifier, label context and aggregated link of a column. In some embodiments, one or more data structures other than tables can be used to make accessible relationships between label identifiers, label contexts and/or aggregated link identifiers. For example, a database such as a relational database can be used to represent such relationships or associations. In some embodiments, a linked list data structure (e.g., a linked list in which each node has a data field for a label identifier and a data field for an aggregated link identifier) can be used.

Returning to FIG. 1, after access switch 122 has determined which label identifier will be added to data packet P191 to define data packet P192, access switch 122 sends data packet P192 to switch core 130. Data packet P192 is illustrated in FIG. 4 and includes header 421, label stack 422 and trailer 424. Additionally, data packet P192 includes header 411, payload 413 and trailer 414 of data packet P191. Thus, in some embodiments, data packet P191 can be a payload of data packet P192. In some embodiments, one or more portions of data packet P191 can be omitted from data packet P192. For example, header 411 and/or trailer 414 (or portions of header 411 and/or trailer 414) can be omitted from data packet P192.

Header 421 can include, for example, a source identifier or address such as a device address of access switch 122 and a destination identifier or address such as a broadcast address, unicast address such as a device address of switch core 130, or a multicast address. Label stack 422 can include label values such as a label identifier and label context that individually and/or collectively identify a source aggregated link of data packet P191. In some embodiments, label stack 422 can include additional label values such as destination aggregated links, virtual local area network identifiers, and/or other label values. Trailer 424 can include a checksum or digital signature of one or more portions of data packet P192 such as payload 413. In some embodiments, one or more of header 421, payload 413, and trailer 424 can be omitted or include additional or different information than discussed above. For example, trailer 424 can be omitted from data packet P192 and header 421 can include a synchronization sequence.

Returning to FIG. 1, switch core 130 receives data packet P192 and sends data packet P193 to other network elements of communications network 100. In other words, switch core 130 switches or routes data packet P192 (modified as illustrated in FIG. 4 to define data packet P193) within communications network 100. As illustrated in FIG. 4, data packet P193 includes header 431 and trailer 434. Header 431 and trailer 434 can include information and/or values similar to the information and/or values included in data packet P192 and described above. In some embodiments, header 431 and trailer 434 have been updated from header 421 and trailer 424, respectively, to include, for example, a new source identifier, a new destination identifier, and/or a new checksum value.

As illustrated in FIG. 4, data packet P193 also includes label stack 432, header 411, payload 413 and trailer 414. As discussed above in relation to data packet P192, one or more of these portions can be omitted. For example, header 411 and/or trailer 414 can be omitted. In some embodiments, label stack 432 can identical to (i.e., include the same label values in the same order as) label stack 422 of data packet P192. In some embodiments, label stack 432 can include more and/or fewer label values than label stack 422. For example, a network element such as an access switch or switch core can add label values to or remove label values from a label stack. In some embodiments, label stack 432 includes label values from label stack 422 that have been reordered from an ordering within label stack 422.

Returning to FIG. 1, switch core 130 sends data packet P193 to access switches 121, 123 and 124. As illustrated in FIG. 1, switch core 130 does not send data packet P193 to access switch 122 because access switch 122 sent data packet P192 (the data packet on which data packet P193 is based) to switch core 130. In some embodiments, switch core 130 can send data packet P193 to access switch 122. For example, switch core 130 can perform processing of data packet P192, network accounting, and/or other functions and then return portions of data packet P192 to access switch 122 as data packet P193. In some embodiments, access switch 122 can be operatively coupled to a computing device in addition to computing device 112. Switch core 130 can send data packet P193 to access switch 122 and access switch 122 can send data packet P193 to the additional computing device. In alternative embodiments, access switch 122 can send data packet P191 to the additional computing device before or after sending data packet P191 (or another data packet such as data packet P192 including data packet P191) to switch core 130, and switch core 130 does not send data packet P193 to access switch 122.

Because data packet P191 is a broadcast data packet, data packet P194 should be sent to all the computing devices other than the computing device that generated or originally sent data packet P191. In other words, data packet P194 should be sent via each individual link (i.e., a link that is not a link of an aggregated link) and via at least one link of each aggregated link other than the individual link or aggregated link via which data packet P191 is transmitted. More specifically with reference to FIG. 1, data packet P194 should be sent to computing device 111 via link L1 and to computing device 113 via aggregated link AL12.

As illustrated in FIG. 4, data packet P194 is identical to data packet P191. This is because the route through communications network 100 was to forward data packet P191 to the destination of data packet P191. That is, data packet P191 is a broadcast data packet and is, therefore, sent to all the computing devices within the same network segment as computing device 112. Because computing device 112 is not directly coupled to those computing devices (i.e., computing devices 111 and 113), computing device 112 relies on communications network 100 to send data packet P191 to those computing devices. Accordingly, communications network 100 sends data packet P191 to computing devices 111 and 113 as though computing device 112 had sent data packet P191 directly to computing devices 111 and 113. In some embodiments, a communications network can alter a data packet before sending (or forwarding) that data packet to a destination (or recipient). For example, a communications network can update time-to-live (TTL) values, accounting values, and/or other values or fields of a data packet before forwarding that data packet to a destination. In some embodiments, a communications network can perform deep packet inspection analysis routines or processes to identify and/or modify data packets with particular properties. Thus, in some embodiments, data packet P194 is not identical to data packet P191.

Returning to FIG. 1, the access switches that receive data packet P193 (access switches 121, 123 and 124 in FIG. 1) can define or generate data packet P194 by discarding or removing one or more portions of data packet P193 from data packet P193. For example, label stack 432 can be discarded from data packet P193. Said differently, data packet P194 (or data packet P191) can be extracted from data packet P193. Additionally, the access switches that receive data packet P193 (access switches 121, 123 and 124 in FIG. 1), determine whether data packet P194 will be sent via the links of those access switches to computing devices. Thus, access switches 121, 123 and 124 each receive data packet P193 and determine the source aggregated link of data packet P193. More specifically, access switches 121, 123 and 124 receive data packet P193 and extract a label identifier and, if used, a label context from label stack 432 of data packet P193. Access switches 121, 123 and 124 then determine the source aggregated link of data packet P191 (the payload of data packet P193) based on the label identifier and, if used, the label context. For example, access switches 121, 123 and 124 can perform a lookup on a table, database, linked list or other data structure to determine an identifier of the source aggregated link of data packet P191. In some embodiments, one or more of access switches 121, 123 and 124 uses a table such as table 500 or table 600 to determined an identifier of the source aggregated link of data packet P191.

After access switches 121, 123 and 124 have determined the source aggregated link of data packet P191, each access switch determines which ports of that access switch are operatively coupled to (or associated with or bound to) that aggregated link. For example, each access switch can include a table, database or other data structure that correlates the ports of that access switch with aggregated links and/or individual links. For example, using an aggregated link identifier as a key, an access switch can determine which, if any, of its ports are operatively coupled to links of that aggregated link. After each access switch of access switches 121, 123 and 124 have determined which ports of that access switch are associated with the source aggregated link of data packet P191, access switches 121, 123 and 124 can send data packet P194 via the links operatively coupled to the remaining ports of each access switch from access switches 121, 123 and 124. In other words, data packet P194 can be sent via the ports or links that are not associated with the source aggregated port of data packet P191. More specifically, data packet P194 can be sent via link L1 and aggregated link AL12. Thus, using an identifier of the source aggregated port of data packet P191, communications network 100 can prevent sending data packet P194 (based on and in some embodiments identical to data packet P191) to the computing device (computing device 112 in FIG. 1) that originally sent data packet P191 via any links of the aggregated link via which that computing device is operatively coupled to communications network 100.

As illustrated in FIG. 1, data packet P194 is sent to computing device 113 via only one link of aggregated link AL12. In some embodiments, access switch 123 and access switch 124 can be configured such that only one of access switch 123 and access switch 124 forwards particular classes of data packets to computing device 113. For example, access switch 123 and access switch 124 can communicate via a control plane of communications network to negotiate which of access switch 123 and access switch 124 will forward multicast and broadcast data packets to computing device 113 via aggregated link AL12. In some embodiments, one access switch from access switch 123 and access switch 124 sends data packets to computing device 113 and both of access switch 123 and access switch 124 receive data packets from computing device 113 via aggregated link AL12. In some embodiments, access switch 123 and access switch 124 negotiate in real time (i.e., when a data packet is received at access switch 123 and/or access switch 124) which of access switch 123 and access switch 124 will send the data packet to computing device 113 via aggregated link AL12. In some embodiments, a control processor (not shown) within or operatively coupled to a control plane of communications network 100 configures access switch 123 and access switch 124 and/or communicates with access switch 123 and access switch 124 to control or direct which of access switch 123 and access switch 124 send individual data packet and/or classes of data packets to computing device 113 via aggregated link AL12.

In some embodiments, access switch 123 and access switch 124 periodically send test data packets (e.g., ping data packets) to computing device 113 and receive responses to the test data packets via links L5 and L6, respectively, to test whether links L5 and L6 are active or operational. If one of links L5 or L6 becomes inoperative, access switch 123 and access switch 124 can communicate (e.g., via a control plane of communications network 100) to determine that the access switch from access switch 123 and access switch 124 that is operatively coupled to the active link of links L5 and L6 will send data packets to computing device 113 via the active link of aggregated link AL12. In some embodiments, data packet P194 can be sent to computing device 113 via each link L5 and L6 of aggregated link AL12 and computing device 113 can discard redundant or duplicate data packets.

In some embodiments, communications network 100 can include more or fewer elements than illustrated in FIG. 1. For example, access switches 121, 122, 123 and 124 can be operatively coupled one to another directly rather than through switch core 130. In some embodiments, data packets P192 and/or data packet P193 can traverse or pass through additional network elements between access switches 121, 122, 123 and/or 124.

Figure 7:
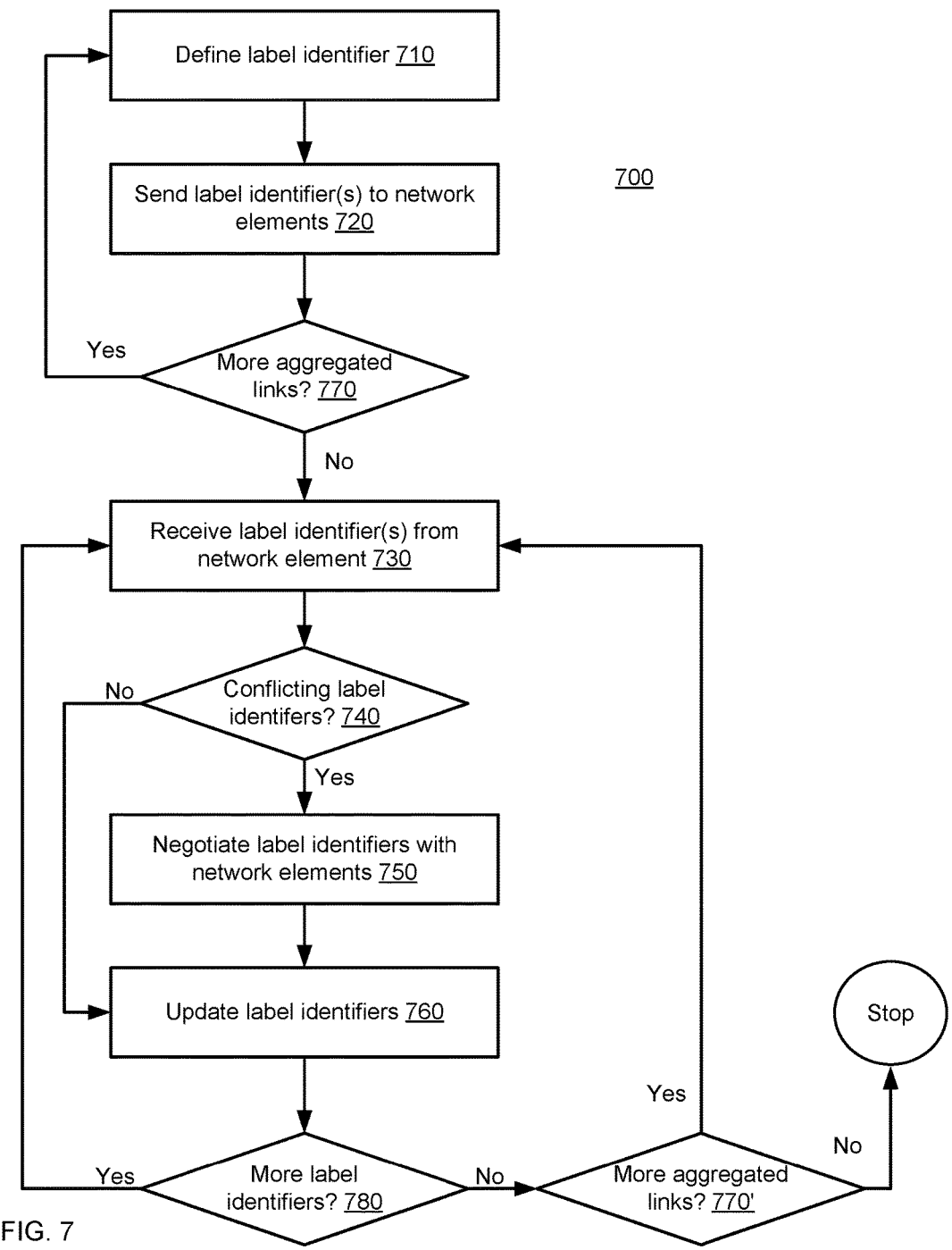
FIG. 7 is a flow chart of a method for distributing label identifiers, according to an embodiment.

FIG. 7 is a flow chart of method 700 for distributing label identifiers, according to an embodiment. In some embodiments, method 700 is executed (or is processed or runs) during provisioning of a communications network (e.g., when the communications network is initialized and network elements and computing devices are operatively coupled to the communications network). In some embodiments, method 700 is executed during operation of a communications network such that network elements and computing devices can be accounted for and processed (e.g., label identifiers can be defines as additional aggregated links are added to the communications network or as additional links are added to existing aggregated links) dynamically (e.g., during operation of the communications network). In some embodiments, method 700 is executed during or as part of provisioning of a communications network and during operation of the communications network.

A label identifier is defined, at 710, in response to, for example, detection of a new aggregated link. For example, an access switch hosting a software module that implements method 700 can define a label identifier when it detects that a link of an aggregated link has become operatively coupled to a port of that access switch. In some embodiments, the access switch can define a label identifier that is unique with respect to label identifiers previously stored at that access switch. The label identifier is then sent to network elements within a communications network, at 720. The network elements can receive the label identifier and insert the label identifier into a list used to determine an aggregated link identifier based on a label identifier. In some embodiments, an aggregated link identifier that identifies an aggregated link associated with the label identifier is sent to the network elements, at 720, with the label identifier. In some embodiments, a label context such as a device identifier of an access switch sending a label identifier is sent to the network elements, at 720. A label context can be used as discussed above to identify an aggregated link.

After the label identifier is sent to network elements (at 720), it is determined whether more aggregated links are detected or not, at 770. If there are more aggregated links, at 770, method 700 can return to step 710 to define a label identifier for another aggregated link. If there are no more aggregated links, at 770, method 700 can stop defining and sending label identifiers to network elements of a communications network. For example, after a label identifier, an optional label context, and an aggregated link identifier for each aggregated link with which an access switch is associated have been sent to the network elements of a communications network, that access switch can cease notifying the network elements about the label identifiers used by that access switch to identify aggregated links.

Concurrently with steps 710, 720 and 770, label identifiers can be received from network elements, at 730. In other words, other network elements within a communications network such as access switches can also implement method 700 and can send label identifiers, label contexts, and/or aggregated link identifiers. After a label identifier is received, the label identifier is compared with other label identifiers to determine whether there is a conflict in the label identifiers, at 740. For example, a label identifier and an aggregated link identifier can be received, at 730. If that label identifier exists, for example, in a table or database (or other data structure) and is associated with an aggregated link different from the aggregated link associated with the received aggregated link identifier, a conflict in the label identifiers exists that can be resolved or rectified. If, conversely, that label identifier does not exist in the table or database or exists for the aggregated link associated with the received aggregated link identifier, a conflict does not exist between label identifiers. Additionally, if label contexts are used, a conflict can exist if both a label identifier and context label exist in the table or database for an aggregated link different from the aggregated link associated with the received aggregated link identifier. If either of the label identifier or context label does not exist in the table or database for an aggregated link different from the aggregated link associated with the received aggregated link identifier, a conflict does not exist. In other words, a conflict exists when a received label identifier and label context exist in a table or database for an aggregated link that is not the aggregated link that is associated with the received aggregated link identifier.

If a conflict between label identifiers exists, network elements within a communications network can negotiate a new or alternate label identifier, at 750. For example, the network element that first detects the conflict can send a broadcast message to other network elements to inform the other network elements of the conflict. That network element can then request that the network element that defined the label identifier giving rise to the conflict define a new label identifier. In some embodiments, the network element that detects the conflict can suggest a new label identifier. That suggestion can, in some embodiments, be deemed or assumed operative or authoritative unless another network element notes a conflict with that label identifier. In some embodiments, the network element that defined the label identifier giving rise to the conflict can ratify the suggested label identifier as authoritative. In some embodiments, a predetermined number of network elements, such as half of the network elements, for example, can ratify the suggested label identifier as authoritative. A network element can ratify a label identifier by, for example, sending a ratification or accept message to the network elements within a communications network after a check for conflicts with other label identifiers indicates no conflicts.

If there are not conflicts, at 740, or if a label identifier has been successfully negotiated such that a conflict has been removed, at 750, a table or database (or other data structure) including label identifiers and associated identifiers of aggregated links at a network element can be updated. That is, the new label identifier, aggregated link identifier and, if used, label context can be added to the table or database.

At 780, if there are more label identifiers, method 700 can return to step 730 to receive a label identifier, aggregated link identifier and, if used, a label context. Steps 730, 740, 750, 760 and 780 are then repeated as appropriate to update the label identifiers stored at a network element. If there are no more label identifiers, at 780, method 700 can proceed to 770'. If there are more aggregated links at the network element, method 700 can return to step 730 to receive a label identifier, aggregated link identifier and, if used, a label context. Steps 730, 740, 750, 760 and 780 are then repeated as appropriate to update the label identifiers stored at a network element. If there are no more aggregated links at the network element for which label identifiers are to be defined, method 700 can stop.

Method 700 can include more or fewer steps than illustrated in FIG. 7. Additionally, the steps of method 700 can be rearranged from the order illustrated in FIG. 7. For example, steps 710 and 720 can be processed (or executed) serially rather than concurrently with other steps of method 700. In some embodiments, steps 710, 720 and 770 can be processed after steps 730, 740, 750, 760 and 780. Furthermore, in some embodiments, step 750 can include multiple sub-steps to effect negotiation of a new label identifier. Additionally, in some embodiments, access switches and/or other network elements within a communications network can be preconfigured or statically configured with lookup tables and/or databases to map or relate label identifiers and/or label contexts to aggregated link identifiers.

FIG. 8 is a flow chart of a method, according to an embodiment. In some embodiments, the steps of method 800 can be performed by a processor operatively coupled to (1) a memory configured to store label identifiers associated with aggregated links and (2) a communications interface operatively coupled to a communications network.

Method 800 includes, at 810, receive, at a first time and via a communications interface, a label identifier associated with an aggregated link (1) within a communications network and (2) including multiple redundant links operatively coupled to multiple network elements of the communications network. The label identifier is stored, after the first time and before a second time, at a first memory location of a memory to produce a stored label identifier, at 820.

A label context identifier associated with a network element within the communications network is received, at 830. The method 800 further includes, at 840, storing, at the third time and before a second time, at a second memory location of the memory the label context identifier to produce a stored label context identifier such that the first memory location is associated with the second memory location.

A data packet including a label identifier corresponding to the stored label identifier and a label context identifier corresponding to the stored label context identifier is received at a second time after the first time and via the communications interface, at 850. The label identifier and the label context identifier are discarded from the data packet, at 860, and (1) the data packet, or (2) the data packet with one or more portions of the data packet omitted, is sent via a first link separate from the aggregated link based on the label identifier, at 870. The data packet is not sent, based on the label identifier, via a link from the multiple redundant links of the aggregated link, at 880.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

A processor can be, for example, a single physical processor such as a general-purpose processor, an ASIC, a PLD, or a FPGA having a single processing core or a group of processing cores. In some embodiments, a processor can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In some embodiments, a processor can be a group of distributed processors (e.g., computing devices with one or more physical processors) operatively coupled one to another via a communications network. Said differently, a processor can be a group of distributed processors in communication one with another via a communications network. In some embodiments, a processor can be a combination of such processors. For example, a processor can be a group of distributed computing devices, where each computing device includes a group of physical processors sharing a memory bus and each physical processor includes a group of processing cores.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. For example, embodiments discussed in relation to data packets can be equally applicable to embodiments using or based on data cells. Furthermore, embodiments discussed in relation to communications between a computing device and network elements of a communications network can be applicable to communications between portions or segments of a communications network. Such portions of a communications network can include other communications networks, network elements, and/or groups of computing devices. The embodiments described herein can include various combinations and/or sub-combinations of the functions, components and/or features of the different embodiments described.

What is claimed is:

1. An apparatus, comprising:
   a memory;
   a communications interface configured to be operatively coupled to a communications network; and
   a processor operatively coupled to the memory and the communications interface,
      the processor configured to receive a first label identifier associated with an aggregated link within the communications network via the communications interface, the aggregated link including a plurality of redundant links operatively coupled to a plurality of network communication devices of the communications network and to the processor,
      the processor configured to compare the first label identifier and an aggregated link identifier for the aggregated link with a stored label identifier and a stored aggregated link identifier associated with the stored label identifier, respectively, for a match to identify a conflict between the first label identifier and the stored label identifier,
      the processor configured to define a second label identifier different from the first label identifier based on the conflict,
      the processor configured to send to at least one network communication device from the plurality of network communication devices a signal representing the second label identifier.

2. The apparatus of claim 1, wherein the conflict is based on the aggregated link identifier being different from the stored aggregated link identifier.

3. The apparatus of claim 1, wherein the processor is configured to send, after identifying the conflict, a broadcast message to the plurality of network communication devices, the broadcast message being representative of the conflict.

4. The apparatus of claim 1, wherein:
   the processor is configured to receive a broadcast message from a network communication device from the plurality of network communication devices, the broadcast message being representative of the conflict,
   the processor is configured to receive from the network communication device a request to define the second label identifier based on the conflict.

5. The apparatus of claim 1, wherein:
   the processor is configured to receive a broadcast message from a network communication device from the plurality of network communication devices, the broadcast message being representative of the conflict,
   the processor is configured to receive from the network communication device a request to define the second label identifier,
   the second label identifier is defined at least in part by the network communication device from which the request was received.

6. The apparatus of claim 1, wherein the processor is configured to receive, after the second label identifier is defined by the processor, from the at least one network communication device from the plurality of network communication devices a signal representing a ratification message, the ratification message based at least in part on the second label identifier.

7. The apparatus of claim 1, wherein:
   the processor is configured to store at a first memory location of the memory a label identifier to produce the first stored label identifier,
   the processor is configured to receive a label context identifier associated with a network communication device from the plurality of network communication devices,
   the processor is configured to store at a second memory location of the memory the label context identifier to produce a stored label context identifier.

8. The apparatus of claim 1, wherein the first label identifier is received within a Multiprotocol Label Switching header.

9. The apparatus of claim 1, wherein:
   the processor is configured to be operatively coupled to the communications network that includes a multi-stage switch fabric and the plurality of network communication devices that is a plurality of access switches.

10. A non-transitory processor-readable medium storing code representing instructions to be executed by a processor, the code comprising code to cause the processor to:
    receive a first label identifier associated with an aggregated link within a communication network, the aggregated link including a plurality of redundant links operatively coupled to a plurality of network communication devices of the communications network;
    identify a conflict between a first label identifier and a stored label identifier based on a comparison for a match;
    define a second label identifier different from the first label identifier based on the conflict; and
    send to at least one network communication device from the plurality of network communication devices a signal representing the second label identifier.

11. The non-transitory processor-readable medium of claim 10, wherein the conflict is based on an aggregated link identifier for the aggregated link being different from a stored aggregated link identifier associated with the stored label identifier.

12. The non-transitory processor-readable medium of claim 10, the code further comprising code to cause the processor to:

receive a broadcast message from a network communication device from the plurality of network communication devices, the broadcast message being representative of the conflict.

13. The non-transitory processor-readable medium of claim 10, the code further comprising code to cause the processor to:

receive a broadcast message from a network communication device from the plurality of network communication devices, the broadcast message being representative of the conflict; and receive from the at least one network communication device a request to define the second label identifier.

14. The non-transitory processor-readable medium of claim 10, the code further comprising code to cause the processor to:

receive a broadcast message from a network communication device from the plurality of network communication devices, the broadcast message being representative of the conflict; and receive from the at least one network communication device a request to define the second label identifier, the second label identifier is defined at least in part by the at least one network communication device from which the request was received.

15. The non-transitory processor-readable medium of claim 10, the code further comprising code to cause the processor to:

receive from the at least one network communication device from the plurality of network communication devices a signal representing a ratification message, the ratification message based at least in part on the second label identifier.

16. The non-transitory processor-readable medium of claim 10, the code further comprising code to cause the processor to:

store at a first memory location of a memory operably coupled to the communications network a label identifier to produce the first stored label identifier;

receive a label context identifier associated with a network communication device from the plurality of network communication devices; and store at a second memory location of the memory the label context identifier to produce a stored label context identifier.

17. The non-transitory processor-readable medium of claim 10, wherein the first label identifier is received within a Multiprotocol Label Switching header.

18. The non-transitory processor-readable medium of claim 10, wherein the communications network is a multi-stage switch fabric, and the plurality of network communication devices is a plurality of access switches operatively coupled to the communications network.

19. A non-transitory processor-readable medium storing code representing instructions to be executed by a processor, the code comprising code to cause the processor to:

receive a first label identifier associated with an aggregated link within a communication network, the aggregated link including a plurality of redundant links operatively coupled to a plurality of network communication devices of the communications network;

identify a conflict based on a comparison for a match between the first label identifier and an aggregated link identifier for the aggregated link with a stored label identifier and a stored aggregated link identifier associated with the stored label identifier;

define a second label identifier different from the first label identifier based on the conflict; and send to at least one network communication device from the plurality of network communication devices a signal representing the second label identifier.

20. The non-transitory processor-readable medium of claim 19, wherein the conflict is based on the aggregated link identifier being different from the stored aggregated link identifier.

* * * * *